(12) United States Patent
Sardo

(10) Patent No.: US 11,167,712 B1
(45) Date of Patent: Nov. 9, 2021

(54) BUS SAFETY SHIELD

(71) Applicant: Louis Sardo, Gardena, CA (US)

(72) Inventor: Louis Sardo, Gardena, CA (US)

(*) Notice: Subject to any disclaimer, the term of this patent is extended or adjusted under 35 U.S.C. 154(b) by 102 days.

(21) Appl. No.: 16/858,077

(22) Filed: Apr. 24, 2020

(51) Int. Cl.
| | |
|---|---|
| *B60R 21/12* | (2006.01) |
| *B62D 31/02* | (2006.01) |
| *B60N 2/879* | (2018.01) |
| *B62D 65/14* | (2006.01) |
| *B60N 2/90* | (2018.01) |
| *B60R 13/08* | (2006.01) |

(52) U.S. Cl.
CPC .............. *B60R 21/12* (2013.01); *B60N 2/879* (2018.02); *B60N 2/91* (2018.02); *B62D 31/02* (2013.01); *B62D 65/14* (2013.01); *B60R 2013/0807* (2013.01)

(58) Field of Classification Search
CPC ....... B60R 21/06; B60R 21/12; B60R 21/026; B60N 2/879; B60N 2/91; B62D 31/02
USPC .......................... 296/1.07, 24.4, 24.43, 24.46
See application file for complete search history.

(56) References Cited

U.S. PATENT DOCUMENTS

| | | | | |
|---|---|---|---|---|
| 1,804,033 A | * | 5/1931 | Siggins .................... | B60N 2/91 296/64 |
| 2,732,814 A | * | 1/1956 | Murphy et al. .......... | B61D 1/04 105/324 |
| 4,818,007 A | * | 4/1989 | Mahoney ................ | B60J 1/2011 160/370.21 |
| 7,819,451 B2 | * | 10/2010 | Yoshida .................. | B60R 5/047 296/24.4 |
| 2008/0136205 A1 | * | 6/2008 | Hoffman ................. | B60R 21/06 296/24.46 |
| 2013/0020824 A1 | * | 1/2013 | Tinterow ............ | B60H 1/00592 296/24.46 |
| 2018/0022457 A1 | * | 1/2018 | Papke ................. | B64D 11/0023 244/118.6 |

FOREIGN PATENT DOCUMENTS

| | | | |
|---|---|---|---|
| JP | 2000142476 A | * | 5/2000 |
| JP | 3194723 U | * | 12/2014 |
| JP | 2020131745 A | * | 8/2020 |

* cited by examiner

*Primary Examiner* — Hilary L Gutman

(74) *Attorney, Agent, or Firm* — Goldstein Law Offices, P.C.

(57) ABSTRACT

A protective shield assembly for use on a bus is disclosed. The assembly includes a first fastener affixed to the luggage rack of the bus, a second fastener affixed to a rear surface of the backrest of the seats of a row of the bus, and a body extending between the luggage rack and the seats to form a barrier between adjacent rows. The body includes an upper end having a third fastener and a lower end having a lower edge, a cut-out, a fourth fastener, and a furled portion. The third fastener is attached to the first fastener and the fourth fastener is attached to the second fastener fixing the body in position. The cut-out divides the furled portion into a left portion and a right portion that selectively and independently uncurl as the body is pulled toward a planar configuration when one of the seats is reclined.

19 Claims, 8 Drawing Sheets

BUS SAFETY SHIELD

TECHNICAL FIELD

The present disclosure relates generally to safety shields. More particularly, the present disclosure relates to a safety shield for attachment to bus seats.

BACKGROUND

Buses are one of the most convenient and effective means for public transportation and are commonly the most heavily used modes of transit in larger cities. A typical coach bus is configured with various rows having four seats, in which the rows are bifurcated by an aisle such that the rows include two independently reclinable seats on each side of the aisle. Because buses are modes of public transportation, efficiency is of paramount concern. Thus, too maximize efficiency and increase the number of passengers they can accommodate, buses are manufactured with less space between seats leading to a more compact cabin. However, more compact cabins leads to more confined and crowded buses that can act as hotspots for spreading disease. Indeed, buses are heavily linked with the spread of infectious disease.

Accordingly, there is a need for a bus safety shield that is attachable to the bus seats and the luggage rack immediately above the bus seats so as to form a barrier between the bifurcated rows that blocks bodily fluid particles released from sneezing, coughing, and talking passengers from entering or contaminating adjacent rows.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a protective shield that can be affixed between the rows of bus seats so as to create a protective barrier therebetween. Accordingly, the present disclosure provides a shield including a body having fasteners disposed at opposite ends of the body, wherein the fasteners are configured to attach to the rear surface of the backrest of each of the bus seats and the luggage rack immediately above the bus seats so as to form a vertical barrier positioned between the rows.

An aspect of an example embodiment in the present disclosure is to provide a protective shield that can be affixed to adjacent bus seats within a row and the luggage rack immediately thereabove and enables independent reclining of the bus seats. Accordingly, the present disclosure provides a shield including a length that provides enough slack for a user to adjust the incline of a seat as desired without detaching, overstretching or damaging the shield, or otherwise altering the structure, position, and function of the shield.

An aspect of an example embodiment in the present disclosure is to provide a protective shield that can be affixed to adjacent bus seats within a row and the luggage rack immediately thereabove and enables each of the bus seats to which the protective shield is attached, to move freely and independently relative to each other. Accordingly, the present disclosure provides a shield including a lower edge having a cut-out that divides the lower edge into equal halves, wherein each lower edge half is attachable to a seat and wherein the cut-out enables independent movement of each lower edge half, such that each seat can move independently relative to the other without affecting the positioning of the protective shield.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

Figure 1:
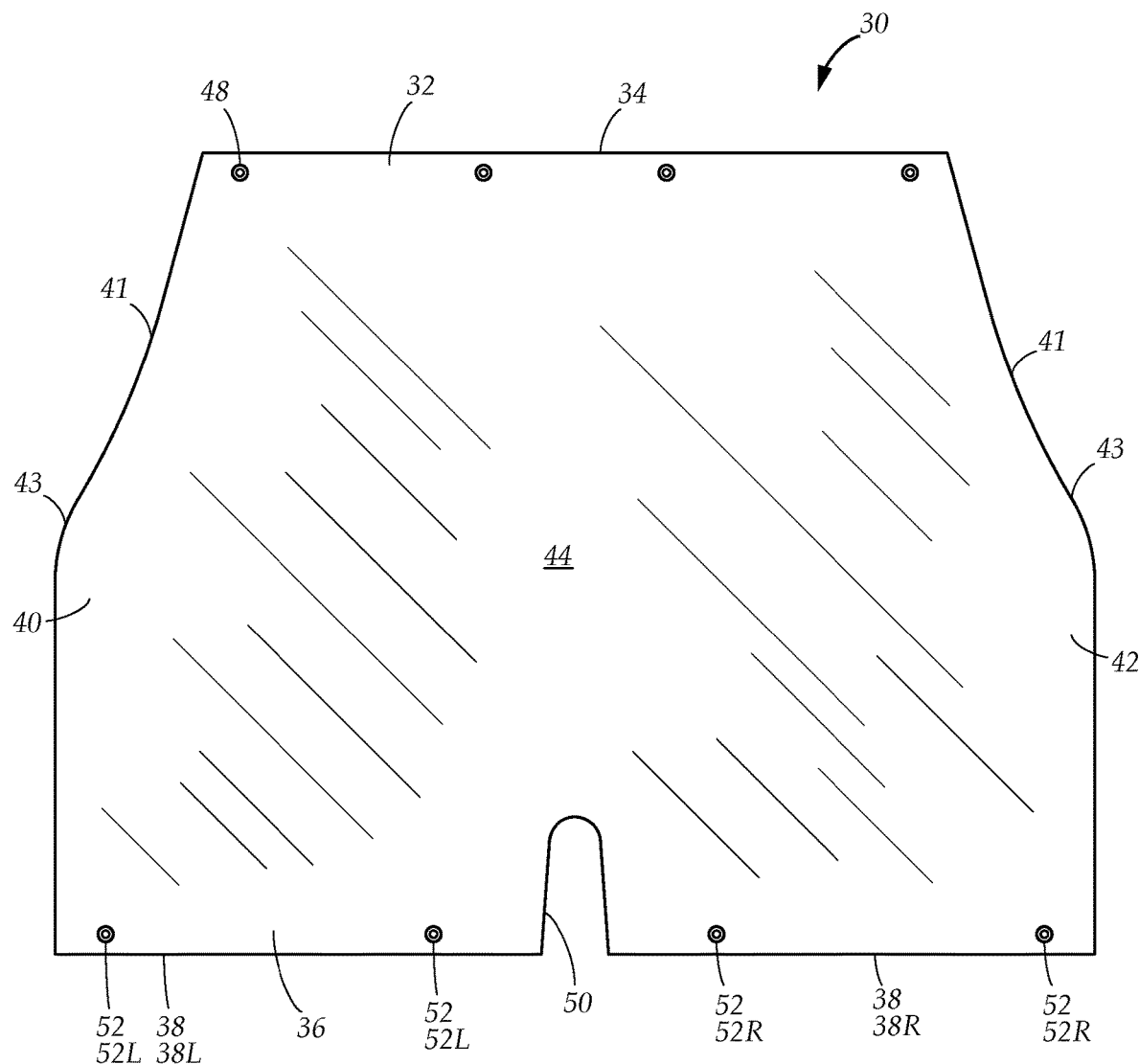
FIG. 1 is an elevation view of the body of the bus safety shield, illustrating the structure of the body of the bus safety shield when unattached to the bus seats of a bus according to one embodiment of the present disclosure.
Figure 2:
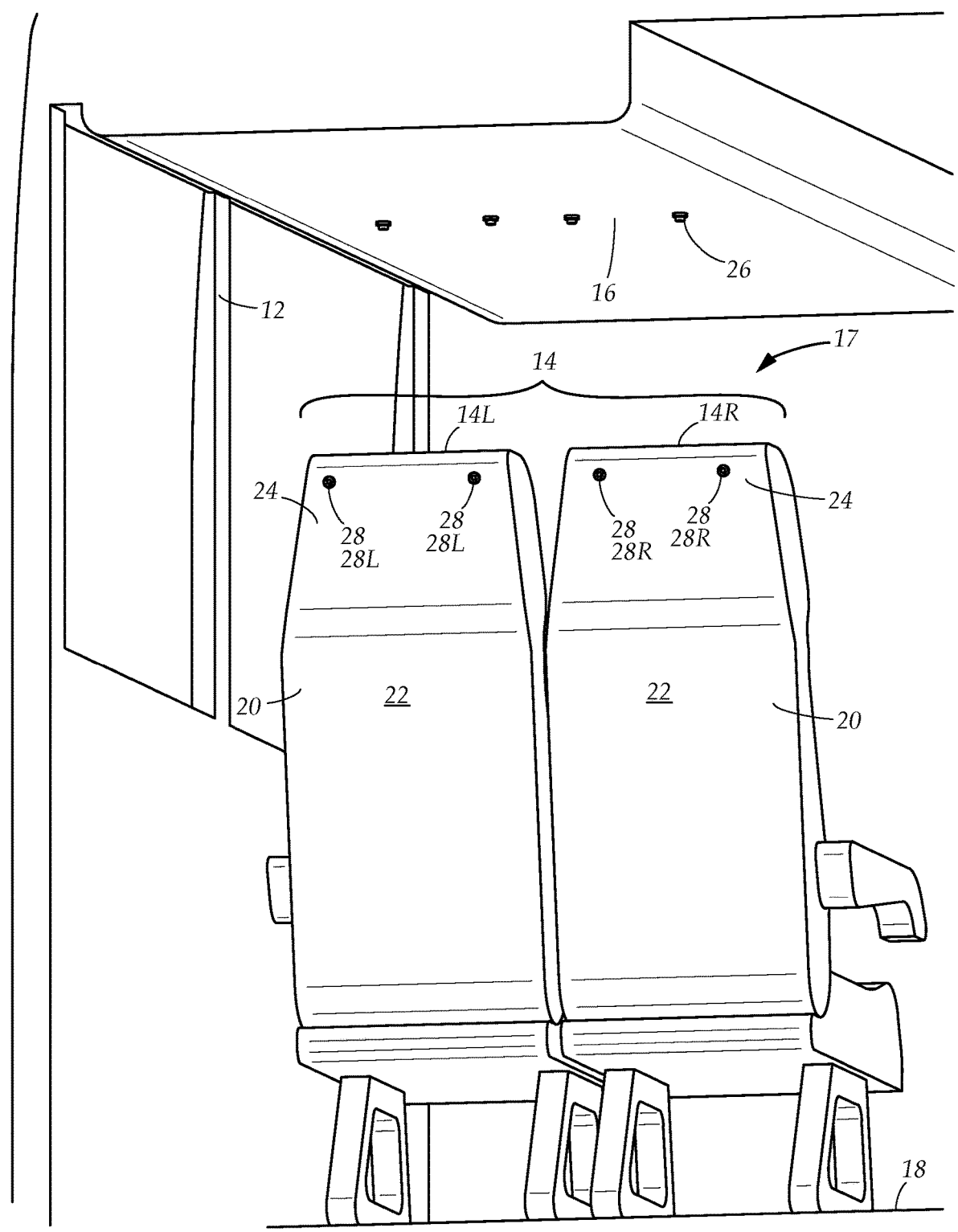
FIG. 2 is a perspective view of the first set of mating fasteners mounted onto the luggage rack and the second set of mating fasteners mounted onto the upper area of the rear surface of the backrest of the left seat and right seat of the row that is directly underneath the first set of mating fasteners, illustrating one manner in which the first set and second set of mating fasteners are attached to the luggage rack and left and rear seats, respectively, prior to attaching the body according to one embodiment of the present disclosure.
Figure 3:
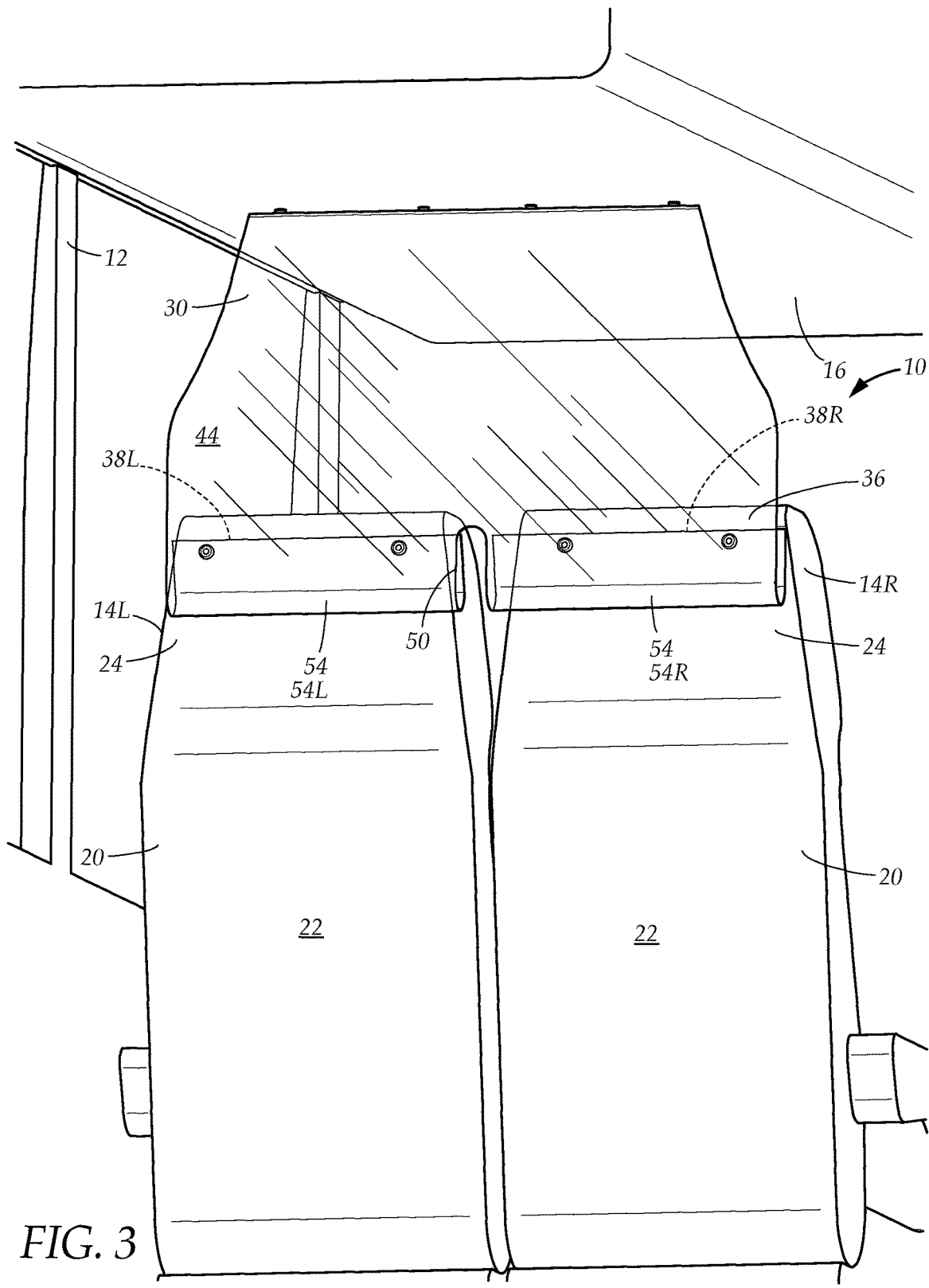
FIG. 3 is a rear perspective view of the bus safety shield assembly formed when the body is attached to the luggage rack and the left seat and the right seat of a row of the bus, illustrating the configuration of the body relative to the luggage rack, the left seat, and the right seat when attached thereto according to one embodiment of the present invention.
Figure 4:
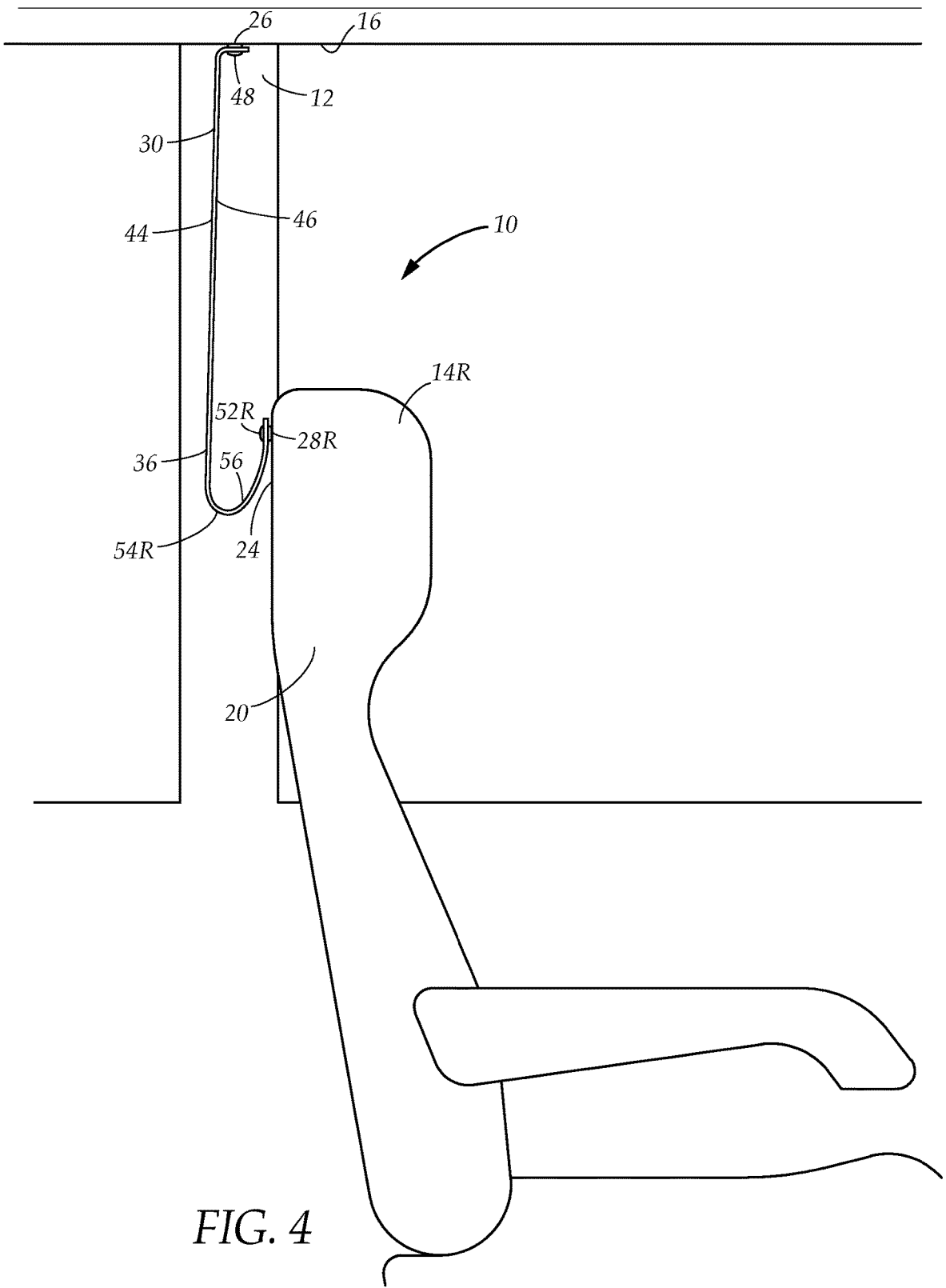
FIG. 4 is a side view of the bus safety shield assembly, illustrating the configuration of the furled portion of the body relative to the left seat and right seat when neither the left seat or the right seat are in a reclined position.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

FIGS. 1-4 and 6 illustrate a protective shield assembly 10 for use on a bus 12, such as a coach bus or charter bus, comprising a front, a rear, a plurality of rows 14, a luggage rack 16 directly above each of the rows 14, and an aisle 18 adjacent to the rows 14. Each of the rows 14 is defined by a left seat 14L and a right seat 14R. The left seat 14L and the right seat 14R each comprise a backrest 20 including a rear surface 22 having an upper area 24.

The assembly 10 includes a first set of mating fasteners 26 affixed to the luggage rack 16, a second set of mating fasteners 28 affixed to the upper area 24 of the rear surface 22 of the backrest 20 of the left seat 14L and the right seat 14R, and a planar and flexible body 30 extending substantially vertically from the first set of mating fasteners 26 to the second set of mating fasteners 28 so as to extend from the luggage rack 16 to the upper area 24 of the rear surface 22 of the backrest 20 of the left seat 14L and the right seat 14R to cover the open area 17 area between the luggage rack 16 the left seat 14L and right seat 14R and form a barrier between adjacent rows of the plurality of rows 14.

The first set of mating fasteners 26 are transversely aligned along the luggage rack 16 and positioned directly above the second set of mating fasteners 28 such that the first set and second set of mating fasteners 26, 28 are substantially aligned. The second set of mating fasteners 28 include a left pair of mating fasteners 28L attached to the left seat 14L and a right pair of mating fasteners 28R attached to the right seat 14R.

The body 30 comprises an upper end 32 including an upper edge 34, a lower end 36 opposite the upper end 32 and including a lower edge 38 opposite the upper edge 34, a left side 40, a right side 42 opposite the left side 40, a front surface 44, and a rear surface 46. The body 30 comprises a transparent and nonporous material so as not to obstruct passengers views while blocking all bodily fluid particles released from any sneezing, coughing, and talking passengers in adjacent rows. The front surface 44 faces toward the rear of the bus 12, and the rear surface 46 faces toward the front of the bus 12. In embodiments, the body 30 tapers in width from the lower end 36 to the upper end 32 such that the upper end 32 and upper edge 34 include a length smaller than a length of the lower end 36 and the lower edge 38, respectively. In some embodiments, the left side 40 and the right side 42 comprise curved edges 41 defining shoulders 43 that are configured to accommodate the curvature of the windows or walls of the bus 12.

The upper end 32 includes a third set of mating fasteners 48 disposed adjacent to the upper edge 34. The third set of mating fasteners 48 are removably attached to the first set of mating fasteners 26. In embodiments, the third set of mating fasteners 48 are disposed on the front surface 44 of the body 30. In other embodiments, the third set of mating fasteners 48 are disposed on the rear surface 46 of the body 30. In embodiments, the first set of mating fasteners 26 comprise the female portion of a snap button, while the third set of mating fasteners 48 comprise the male portion of a snap button such that the first set and second set of mating fasteners 26, 48 may detachably engage.

The lower end 36 includes a cut-out 50 and a fourth set of mating fasteners 52 adjacent to the lower edge 38. The cut-out 50 extends upwardly from the lower edge 38 toward the upper edge 34. The cut-out 50 divides the lower edge 38 into equal halves including a left lower edge half 38L and a right lower edge half 38R. The left lower edge half 38L is attached to the left seat 14L and the right lower edge half 38R is attached to the right seat 14R. The cut-out 50 is positioned between the left seat 14L and the right seat 14R.

The fourth set of mating fasteners 52 are disposed on the front surface 44 of the body 30. In other embodiments, the fourth set of mating fasteners 52 are disposed on the rear surface 46 of the body 30. The fourth set of mating fasteners 52 are removably attached to the second set of mating fasteners 28. The fourth set of mating fasteners 52 include a left pair of mating fasteners 52L disposed on the left lower edge half 38L and a right pair of mating fasteners 52R disposed on the right lower edge half 38R. The left pair of mating fasteners 52L of the fourth set of mating fasteners 52 are removably attached to the left pair of mating fasteners 28L of the second set of mating fasteners 28. The right pair of mating fasteners 52R of the fourth set of mating fasteners 52 are removably attached to the right pair of mating fasteners 28R of the second set of mating fasteners 28. In embodiments, the second set of mating fasteners 28 comprise the female portion of a snap button, while the fourth set of mating fasteners 52 comprise the male portion of a snap button such the second set and fourth set of mating fasteners 28, 52 may detachably engage.

The lower end 36 selectively includes a furled portion 54 curled from the lower edge 38. The cut-out 50 divides the furled portion 54 into equal halves including a left furled portion 54L and a right furled portion 54R. The left furled portion 54L includes the left lower edge half 38L. The right furled portion 54R includes the right lower edge half 38R. The left furled portion 54L is positioned adjacent to the left seat 14L and the right furled portion 54R is positioned adjacent to the right seat 14R. The left furled portion 54L and the right furled portion 54R form an arch 56 between the left seat 14L and the right seat 14R, respectively, and the body 30.

Figure 5:
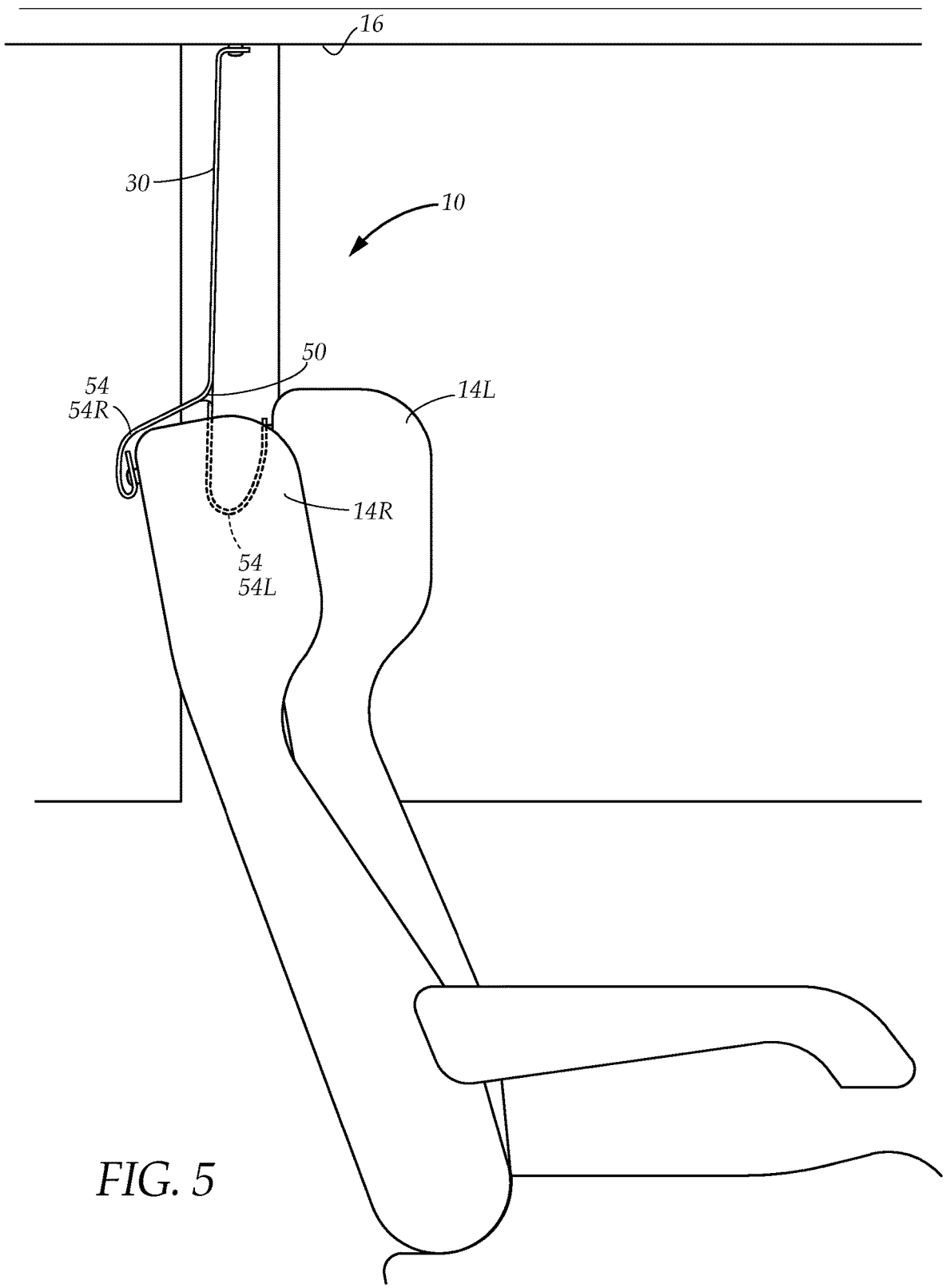
FIG. 5 is a side view of the bus safety shield assembly, illustrating the configuration of the furled portion of the body relative to the left seat and right seat and with respect to itself when the right seat is in a reclined position.
Figure 6:
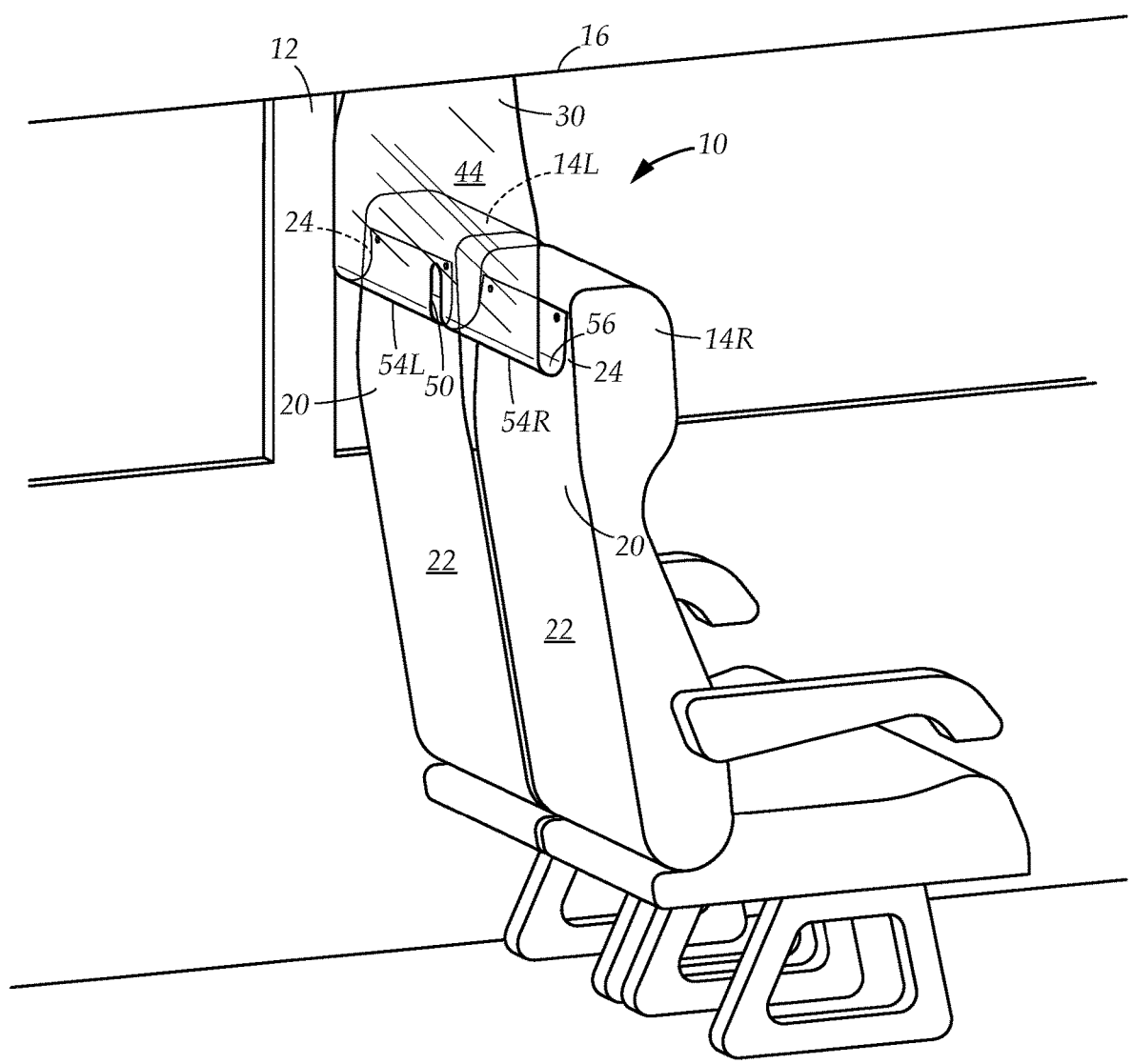
FIG. 6 is a side perspective view of the bus safety shield assembly, illustrating the configuration of the furled portion of the body relative to the left seat and right seat when neither the left seat or the right seat are in a reclined position.
Figure 7:
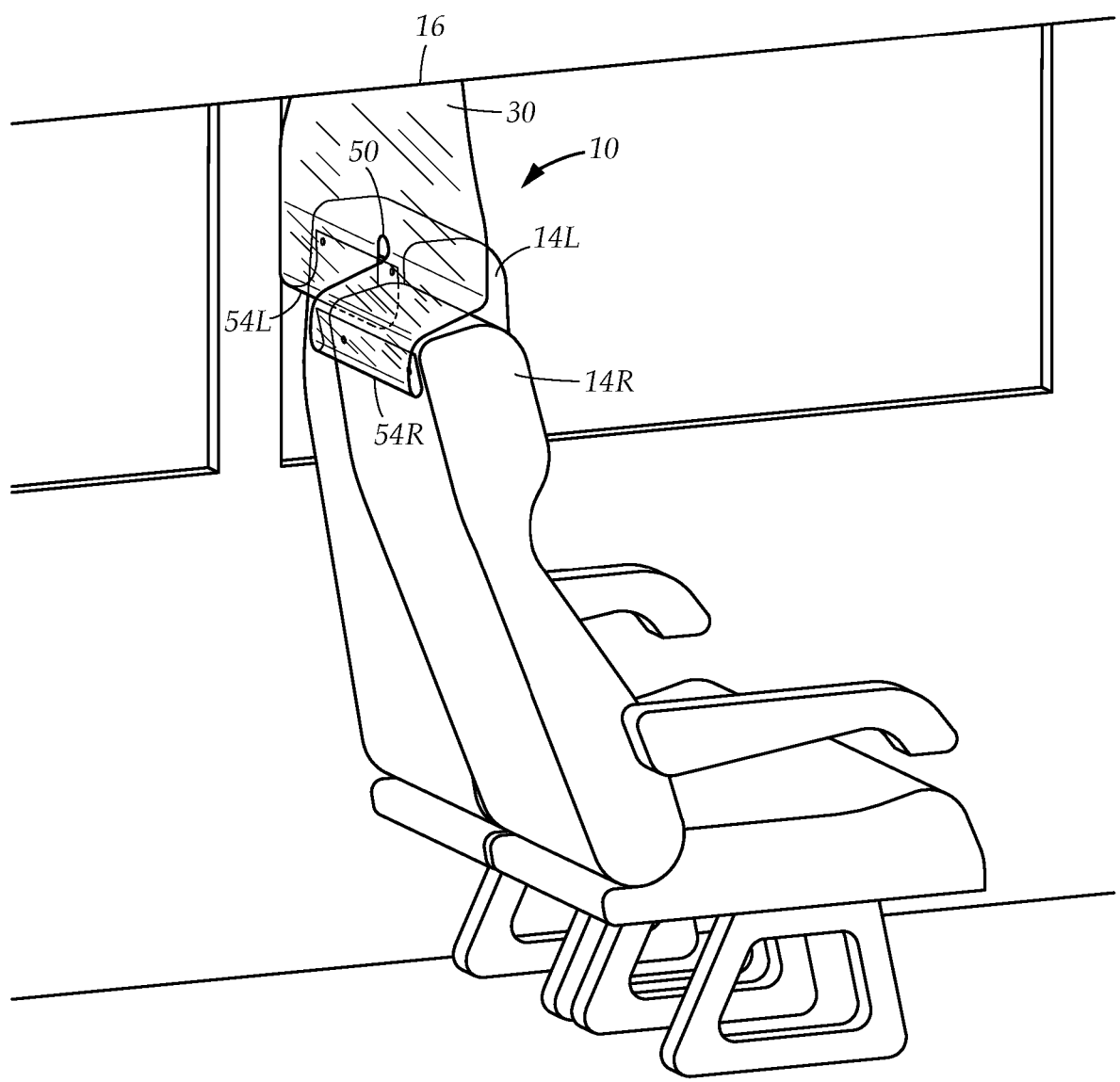
FIG. 7 is a side perspective view of the bus safety shield assembly, illustrating the configuration of the furled portion of the body relative to the left seat and right seat and with respect to itself when the right seat is in a reclined position.
Figure 8:
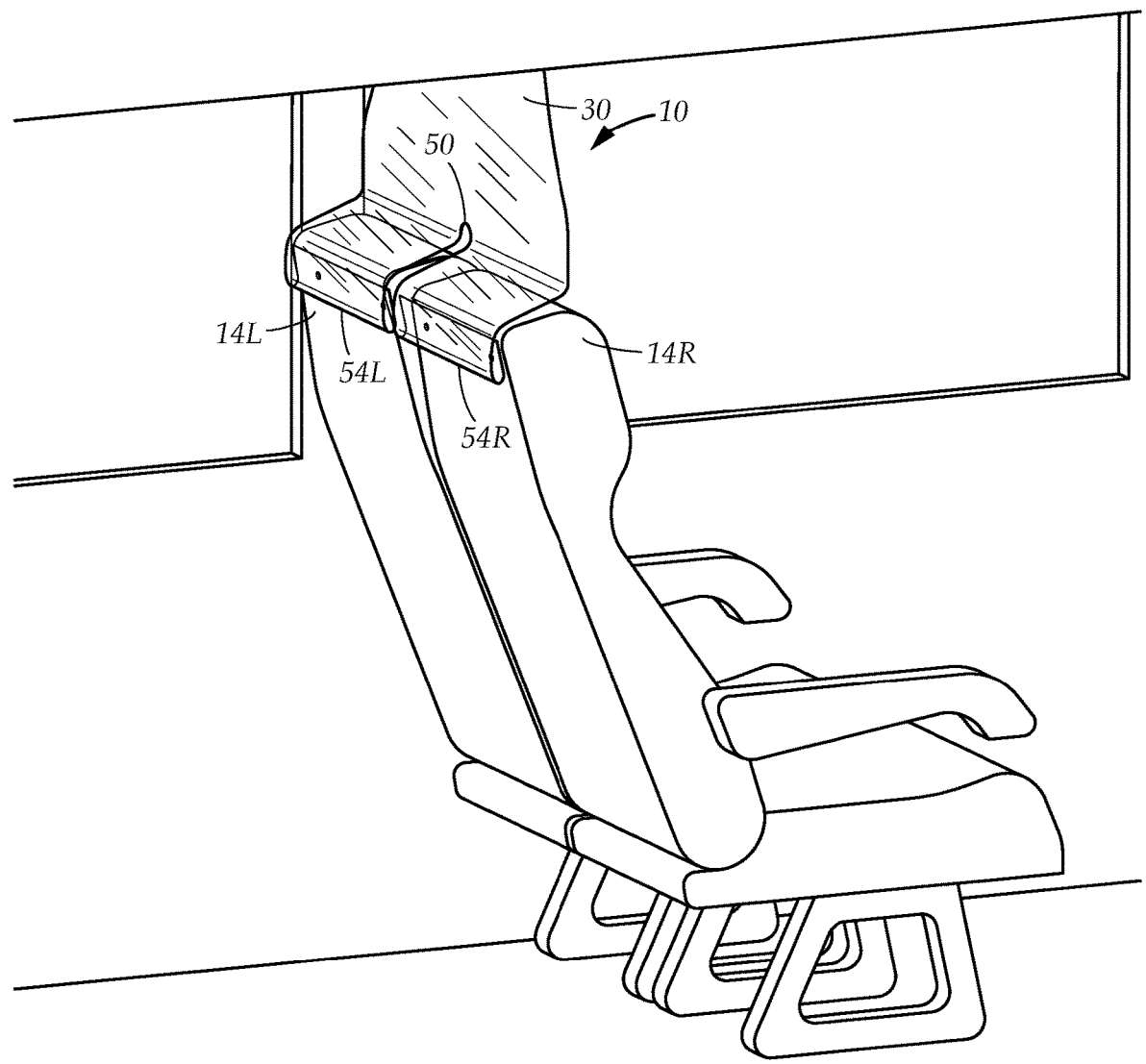
FIG. 8 is a side perspective view of the bus safety shield assembly, illustrating the configuration of the furled portion of the body relative to the left seat and right seat and with respect to itself when the left seat and the right seat are in a reclined position.

Referring now to FIGS. 5, 7, and 8, the furled portion 54 selectively uncurls as the body 30 is pulled toward a planar configuration when either the left seat 14L or the right seat 14R are reclined. The furled portion 54 creates slack in the body 10 that enables passengers to recline their seats as desired without detaching the shield from the luggage rack 16 and/or seats 14R, 14L, and/or overstretching or damaging the body 30, or otherwise compromising the structural integrity and function of the assembly 10. Further, the left furled portion 54L and the right furled portion 54R are unfurlable independently with respect to each other about the cut-out 50 to enable the left seat 14L and the right seat 14R to recline independently with respect to each other. In this way, the assembly 10 enables a passenger in the right seat 14R for example, to recline their seat while a passenger in the left seat 14L keeps their seat in an upright position.

Referring back to FIGS. 1-3, the present disclosure also provides a method for mounting the protective shield assembly 10 to the rows 14 of the bus 12. In one method of mounting the protective shield assembly 10, the first set of mating fasteners 26 are attached transversely along the luggage rack 16 and the second set of mating fasteners 28 are the upper area 24 of the rear surface 22 of the backrest 20 of the left seat 14L and the right seat, such that the second set of mating fasteners 28 are positioned directly below and aligned with the first set of mating fasteners 26. Next, the method includes attaching the body 30 to the luggage rack 16 by mating the first set of mating fasteners 26 with the third set of mating fasteners 48. Next, the method includes extending the body 30 substantially vertically over the open area 17 between the luggage rack 16 and the left seat 14L and right seat 14R. Lastly, the method includes furling the body 30 near the lower edge 38 by attaching the body 30 to the left seat 14L and the right seat 14R by mating the fourth set of mating fasteners 52 on the body 30 to the second set of mating fasteners 28 on the left seat 14L and right seat 14R. In one embodiment, the method includes unfurling the body 30 from either one of the left lower edge half 38L and the right lower edge half 38R by reclining one of the left seat 14L and the right seat 14R, respectively. In embodiments, the step of furling the body 30 comprises mating the left pair of mating fasteners 28L of the second set of mating fasteners 28 with the left pair of mating fasteners 52L of the fourth set of mating fasteners 52 and mating the right pair of mating fasteners 28R of the second set of mating fasteners 28 with the right pair of mating fasteners 52R of the fourth set of mating fasteners 52.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly. The term "substantially" is defined as at least 95% of the term being described and/or within a tolerance level known in the art and/or within 5% thereof.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a bus safety shield. The disclosure is illustrated by example in the drawing figures, and throughout the written description. It should be understood that numerous variations are possible, while adhering to the inventive concept. Such variations are contemplated as being a part of the present disclosure.

What is claimed is:

1. A protective shield assembly for use on a bus including a front, a rear, a plurality of rows, a luggage rack directly above each of the rows, an aisle adjacent to the rows, each of the rows including a left seat and a right seat, each of the left seat and the right seat including a backrest having a rear surface including an upper area, the assembly comprising:
   a first set of mating fasteners affixed to the luggage rack, the first set of mating fasteners transversely aligned along the luggage rack;
   a second set of mating fasteners affixed to the upper area of the rear surface of the backrest of the left seat and the right seat, the first set of mating fasteners positioned directly above the second set of mating fasteners; and
   a flexible body including an upper end having an upper edge, a lower end having a lower edge, the upper end opposite the lower end, the upper edge opposite the lower edge, a left side, a right side, the left side opposite the right side, a front surface, and a rear surface, the front surface opposite the rear surface, the upper end including a third set of mating fasteners disposed adjacent to the upper edge, the third set of mating fasteners removably attached to the first set of mating fasteners, the lower end including a cut-out and a fourth set of mating fasteners adjacent to the lower edge, the cut-out extending upwardly from the lower edge toward the upper edge and dividing the lower edge into equal halves including a left lower edge half and a right lower edge half, the fourth set of mating fasteners removably attached to the second set of mating fasteners, the lower end selectively including a furled portion curled from the lower edge;
   wherein:
   the furled portion selectively uncurls as the body is pulled toward a planar configuration when one of the seats is reclined;
   the body extends substantially vertically from the first set of mating fasteners to the second set of mating fasteners; and the front surface of the body faces toward the rear of the bus, and the rear surface of the body faces toward the front of the bus.

2. The assembly of claim 1, wherein:
the left lower edge half is attached to the left seat and the right lower edge half is attached to the right seat; and
the cut-out is positioned between the left seat and the right seat.

3. The assembly of claim 2, wherein the cut-out divides the furled portion into equal halves including a left furled portion and a right furled portion, the left furled portion including the left lower edge half, the right furled portion including the right lower edge half, the left furled portion positioned adjacent to the left seat and the right furled portion positioned adjacent to the right seat.

4. The assembly of claim 3, wherein the left furled portion and the right furled portion are unfurlable independently with respect to each other about the cut-out to enable the left seat and the right seat to recline independently with respect to each other.

5. The assembly of claim 4, wherein:
the second set of mating fasteners include a left pair of mating fasteners disposed on the left seat and a right pair of mating fasteners disposed on the right seat; and
the fourth set of mating fasteners include a left pair of mating fasteners disposed on the left lower edge half and a right pair of mating fasteners disposed on the right lower edge half;
wherein:
the left pair of mating fasteners of the second set of mating fasteners are removably attached to the left pair of mating fasteners of the fourth set of mating fasteners; and
the right pair of mating fasteners of the second set of mating fasteners are removably attached to the right pair of mating fasteners of the fourth set of mating fasteners.

6. The assembly of claim 5, wherein the fourth set of mating fasteners are disposed on the front surface of the body.

7. The assembly of claim 6, wherein the third set of mating fasteners are disposed on the front surface of the body.

8. The assembly of claim 7, wherein:
the first set of mating fasteners, the second set of mating fasteners, the third set of mating fasteners, and the fourth set of mating fasteners comprise snap buttons including a female portion and a male portion;
the first set of mating fasteners and the second set of mating fasteners comprise the female portion of the snap buttons; and
the third set of mating fasteners and the fourth set of mating fasteners comprise the male portion of the snap buttons.

9. A protective shield for use on a bus including a plurality of rows, a luggage rack directly above each of the rows, an aisle adjacent to the rows, a rear, and a front, each of the rows including a left seat and a right seat, each of the left seat and the right seat including a backrest having a rear surface including an upper area, the shield comprising:
a flexible body including an upper end having an upper edge, a lower end having a lower edge, the upper end opposite the lower end, the upper edge opposite the lower edge, a left side, a right side, the left side opposite the right side, a front surface, and a rear surface, the front surface opposite the rear surface, the upper end including a first set of mating fasteners disposed adjacent to the upper edge, the first set of mating fasteners adapted to attach to a luggage rack, the lower end including a cut-out and a second set of mating fasteners disposed adjacent to the lower edge, the cut-out extending upwardly from the lower edge toward the upper edge and dividing the lower edge into equal halves including a left lower edge half and a right lower edge half, the second set of mating fasteners adapted to attach to the upper area of the rear surface of the backrest of the left seat and the right seat that is directly below the area of the luggage rack to which the first set of mating fasteners are adapted to attach, the lower end selectively including a furled portion curled from the lower edge;
wherein:
when the first set of mating fasteners are attached to the luggage rack and the second set of mating fasteners are attached to the upper area of the rear surface of the backrest, the body is mounted between adjacent rows, thereby creating a barrier therebetween;
when the body is mounted the body extends substantially vertically from the luggage rack to the upper area of the rear surface of the back rest, the front surface of the body faces toward the rear of the bus, and the rear surface of the body faces toward the front of the bus; and
when the body is mounted the furled portion selectively uncurls as the body is pulled toward a planar configuration when one of the seats is reclined.

10. The assembly of claim 9, wherein the cut-out divides the furled portion into equal halves including a left furled portion and a right furled portion, the left furled portion including the left lower edge half, the right furled portion including the right lower edge half.

11. The assembly of claim 10, wherein when the body is mounted:
the left lower edge half attaches to the left seat and the right lower edge half attaches to the right seat;
the cut-out is positioned between the left seat and the right seat;
the left furled portion is positioned adjacent to the left seat and the right furled portion is positioned adjacent to the right seat; and
the left furled portion and the right furled portion are uncurlable independently with respect to each other about the cut-out to enable the left seat and the right seat to recline independently with respect to each other.

12. The assembly of claim 11, wherein the second set of mating fasteners are disposed on the front surface of the body.

13. The assembly of claim 12, wherein the first set of mating fasteners are disposed on the front surface of the body.

14. The assembly of claim 13, wherein:
the first set of mating fasteners and the second set of mating fasteners comprise snap buttons.

15. A method of mounting a protective shield assembly to a row of seats of a bus to form a barrier between the row of seats and an adjacent row, the bus including a plurality of rows, a luggage rack directly above each of the plurality of rows forming an open area between the luggage rack and each row of the plurality of rows, an aisle adjacent to the rows, a rear, and a front, each of the rows including a left seat and a right seat, each of the left seat and the right seat including a backrest having a rear surface including an upper area, the method comprising:

attaching a first set of mating fasteners transversely along the luggage rack;

attaching a second set of mating fasteners to the upper area of the rear surface of the backrest of the left seat and the right seat, such that the second set of mating fasteners are directly below the first set of mating fasteners;

providing a flexible body including an upper end having an upper edge, a lower end having a lower edge, the upper end opposite the lower end, the upper edge opposite the lower edge, a left side, a right side, the left side opposite the right side, a front surface, and a rear surface, the front surface opposite the rear surface, the upper end including a third set of mating fasteners disposed adjacent to the upper edge, the lower end including a cut-out extending upwardly from the lower edge toward the upper edge and dividing the lower edge into equal halves including a left lower edge half and a right lower edge half, a fourth set of mating fasteners disposed adjacent to the lower edge on both the left lower edge half and right lower edge half and disposed on the front surface of the body;

attaching the upper end of the body to the luggage rack by mating the first set of mating fasteners with the third set of mating fasteners;

extending the body substantially vertically over the open area between the luggage rack and the upper area of the rear surface of the backrest of the left seat and the right seat;

furling the body near the lower edge by attaching the body to the left seat and the right seat by attaching the fourth set of fasteners on the body to the second set of fasteners on the seats; and unfurling the body from one of the left lower edge half and the right lower edge half by reclining one of the left seat and the right seat respectively.

16. The method of claim 15, wherein:

the second set of mating fasteners include a left pair of mating fasteners disposed on the left seat and a right pair of mating fasteners disposed on the right seat; and the fourth set of mating fasteners including a left pair of mating fasteners disposed on the left lower edge half and a right pair of mating fasteners disposed on the right lower edge half.

17. The method of claim 16, wherein the step of furling the body comprises:

mating the left pair of mating fasteners of the second set of mating fasteners with the left pair of mating fasteners of the fourth set of mating fasteners;

mating the right pair of mating fasteners of the second set of mating fasteners with the right pair of mating fasteners of the fourth set of mating fasteners.

18. The method of claim 17, wherein the third set of mating fasteners are disposed on the front surface of the body.

19. The method of claim 18, wherein:

the first set of mating fasteners, the second set of mating fasteners, the third set of mating fasteners, and the fourth set of mating fasteners comprise snap buttons including a female portion and a male portion;

the first set of mating fasteners and the second set of mating fasteners comprise the female portion of the snap buttons; and the third set of mating fasteners and the fourth set of mating fasteners comprise the male portion of the snap buttons.

* * * * *